United States Patent

Weida et al.

[11] Patent Number: 6,014,657
[45] Date of Patent: Jan. 11, 2000

[54] CHECKING AND ENABLING DATABASE UPDATES WITH A DYNAMIC MULTI-MODAL, RULE BASE SYSTEM

[75] Inventors: Robert Anthony Weida, New York, N.Y.; Arthur Reginald Greef, Seattle, Wash.; Frank Vincent Castellucci, Amawalk, N.Y.; Thomas Robert Maguire, Brewster, N.Y.; Carlos Bernadino Eleazar Perez, New York, N.Y.; Dawn Marie Lemrise, Bristol, Conn.

[73] Assignee: International Business Machines Corporation, Armonk, N.Y.

[21] Appl. No.: 08/977,018

[22] Filed: Nov. 27, 1997

[51] Int. Cl.⁷ ............................................ G06F 17/30
[52] U.S. Cl. .................................. 707/2; 707/101
[58] Field of Search ........................... 707/2, 101

[56] References Cited

U.S. PATENT DOCUMENTS

| | | |
|---|---|---|
| 5,228,116 | 7/1993 | Harris et al. ............................ 706/50 |
| 5,546,576 | 8/1996 | Cochrane et al. ........................ 707/2 |
| 5,590,269 | 12/1996 | Kruse et al. ............................ 705/9 |
| 5,720,033 | 2/1998 | Deo ........................................ 713/201 |
| 5,748,975 | 5/1998 | Van De Vanter ...................... 707/531 |
| 5,835,758 | 11/1998 | Nochur et al. ......................... 707/102 |
| 5,862,325 | 1/1999 | Reed et al. ............................. 707/10 |
| 5,870,746 | 2/1999 | Knutson et al. ....................... 707/101 |
| 5,873,075 | 2/1999 | Cochrane et al. ....................... 707/2 |

*Primary Examiner*—Wayne Amsbury
*Attorney, Agent, or Firm*—Steven J. Meyers

[57] ABSTRACT

This invention uses a rule based system which is configurable at run time(1) to decide whether suitable preconditions exist for proposed modifications to a data base, (2) if not, optionally attempt to bring about such preconditions, and (3) prevent the proposed modifications if preconditions remain unmet.

17 Claims, 3 Drawing Sheets

CHECKING AND ENABLING DATABASE UPDATES WITH A DYNAMIC MULTI-MODAL, RULE BASE SYSTEM

FIELD OF INVENTION

This invention involves the use of a rule based system which is configurable at run time (1) to decide whether suitable preconditions exist for proposed modifications to a data base, (2) if not, optionally attempt to bring about such preconditions, and (3) prevent the proposed modifications if preconditions remain unmet.

BACKGROUND ART

With the commercial emergence of the Internet, there is considerable incentive to create semantically rich data bases (or knowledge bases) for diverse applications ranging from electronic product catalogs and product configurators to medical terminology's for clinical information systems. Knowledge representation formalisms for expressing the content of such semantic databases include IBM's Object-Centered Constraint Model (OCCM) formalism.

To date, in all previous database systems, checking of database update operations per se has been implemented directly as part of the systems source code using a programming language as C or Lisp. A common alternative or supplemental technique for maintaining database correctness is the use of database triggers. A trigger is defined as:

"An action causing the automatic invocation of a procedure, for instance to preserve referential integrity. A trigger goes into effect when a user attempts to modify data with an insert or delete, or update command. A trigger can instruct the system to take any number of actions when a specified change is attempted. By preventing incorrect, unauthorized, or inconsistent changes to data, triggers help maintain the integrity of the database" Source: Sybase SQL server Release 10.0 Transact-SQL User's guide, as cited in the FOLDOC on-line dictionary.

SUMMARY OF THE INVENTION

This invention involves the use of a rule based system which is configurable at run time to decide whether suitable preconditions exist for proposed modifications to a data base; if the preconditions do not exist, it optionally attempts to bring them about, and it prevents the proposed modifications if preconditions remain unmet. The invention further involves a system that ensures internal consistency or correctness of content in a semantic database.

The instant invention offers advantages compared with database triggers. A trigger is associated with an attempt to change a particular type of database entity, independent of the command which attempts the change. Triggers make it easy to ensure that all possible changes to those entities are verified. In contrast, the instant invention rule checks are tied to particular commands, so it is straightforward to determine that every command is being appropriately checked by examining the associated rule checks. This approach is more desirable for rich semantic databases, which have highly interdependent entities, because updates can have complex, far reaching consequences. Moreover, both rule checks and their associated rule actions can be tailored to the specifics of different commands.

In addition, the instant system, when compared with directly implemented semantic checking, has several major advantages:

(1.) This modular rule based system for semantic checking fosters a clean separation between database update operations and checking/enabling preconditions for those operations This separation simplifies the task of revising and extending the system's semantic checking capabilities.

(2.) This system's semantic checking behavior can be changed at run time by selecting among the different "modes" for which rule checks and rule actions have been defined.

(3.) Applications can readily customize semantic checking for their own needs by adding, removing, and/or replacing rule checks and their rule actions.

DETAILED DESCRIPTION OF THE INVENTION

Figure 1:
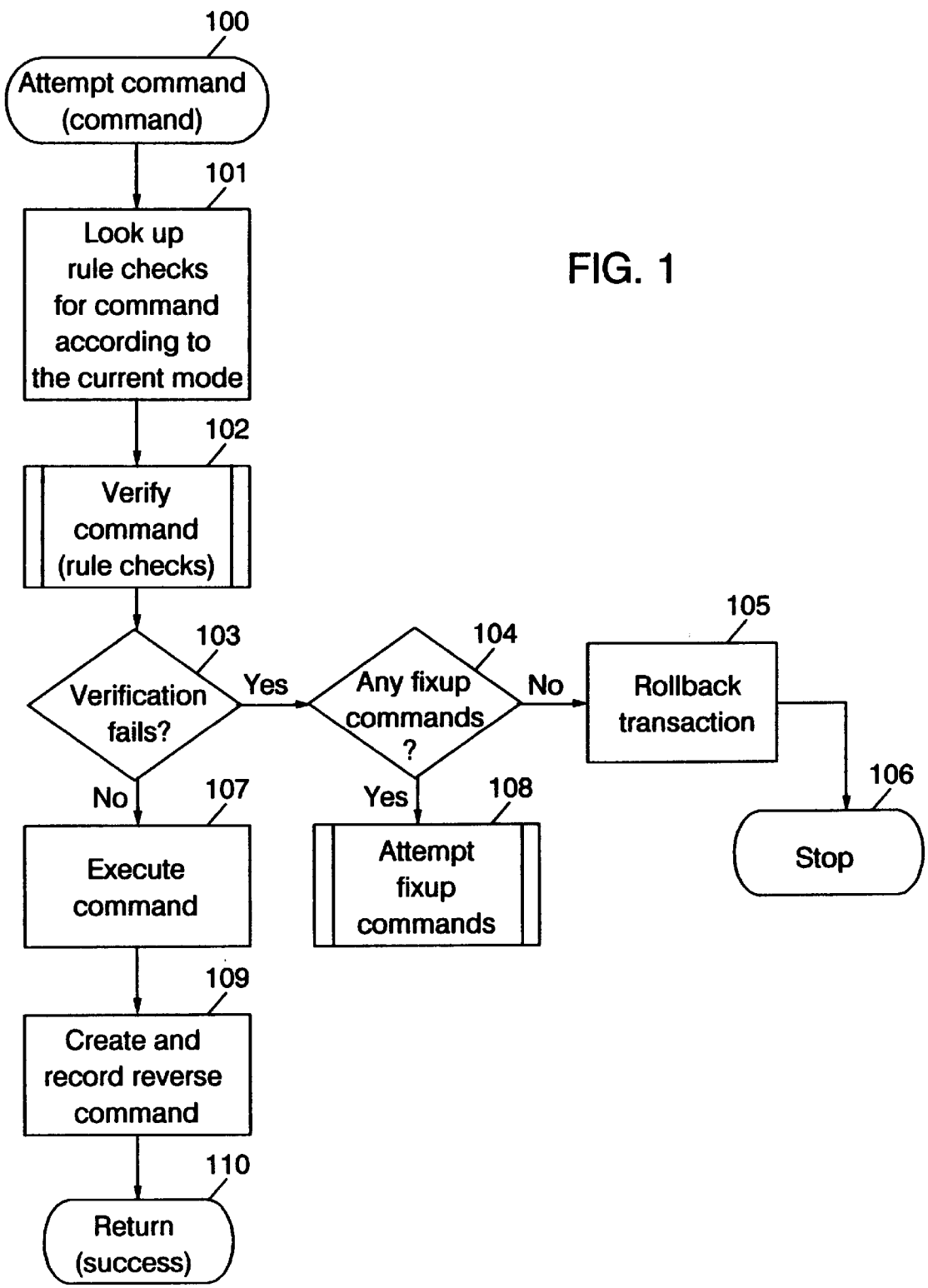
FIG. 1 Depicts the "Attempt Command" process for a given command.

This invention solves two major problems associated with the creation and maintenance of semantic databases.

The first is means of ensuring correctness (i.e., Internal Consistency) of content in a semantic database; which is more complicated than for traditional databases due to several factors:

The complexity of the representation formalism used to express database content (e.g. OCCM is more expressive than the relational mode).

The complexity of the content itself, (e.g., an OCCM database of computer systems and components for an application which configures computer systems is far more intricate than a customer database for a mailing list application).

The complexity of operations which modify the database( resulting from the fact that semantic database content tends to be highly interdependent compared with the content of traditional databases).

Secondly, the scope and extent of consistency checking which is required for a semantic data base can vary along several dimensions:

as the representation formalism evolves ( e.g., enhanced expressiveness enables more powerful reasoning services such as automatic classification which in turn imposes more stringent requirements on the content), across different applications of the semantic database system ( an application for computer system configuration imposes more rigorous requirements than an application for selection of pre-configured systems);

across different phases of development within a single application ( e.g., minimal checking may be appropriate when initiating a semantic database by importing data en masse from external sources. More substantial checking may be desirable later on, as the data is "cleaned up" under the auspices of the semantic database system.) Before detailing our method for handling proposed database, we introduce some technical vocabulary.

An entity: is any constituent of a database. In a relational database, the entities include tables, columns, and rows. In an OCCM database, they include objects such as concepts, and their attributes. An OCCM data base intended for configuration of computer systems would have concepts representing computer systems, disk drives, printers etc.

A command: is used to encapsulate a request as an object, thereby letting you parametize clients with different requests, queue or log requests, and support undoable operations. In an OCCM system, commands can be executed to carry out database updates such as deleting concepts from the database. A generic "create concept" command can be thought of as a template which can be filled out to yield a specific command, e.g. a create concept XYZ command. We will use the word command for both the generic and specific cases; the intended meaning should be clear in context.

An undo command: reverses the effect of another command, e.g., the undo command associated with "create concept XYZ would be "delete concept XYZ". When a command is executed, it may be recorded and an undo command may be associated with it, so that the command can be undone later.

A production rule: (herein after referred to simply as a rule) consists of two parts; a condition and an action. The condition can be tested to decide if it is currently true or false. In case the condition is true, the rule is applicable, and the associated action can be taken. As an example of a production rule is:

If an invention is useful, original and not obvious,
Then conclude that it may be patentable.

A rule based system employs a conflict resolution strategy to decide which rule(s) to execute when more than one is eligible. While numerous strategies are possible, our current implementation executes all eligible rules in sequence.

We use the term rule check for a rule which verifies and possibly enables a precondition for execution of a command. Notice that if the rules, condition is false, then preconditions for execution of the command are not met. Zero or more rule checks are associated with each command. Whenever a command is attempted, the system evaluates the associated rule checks. The set of rule checks is successful if each individual rule check is successful; it fails if any rule check fails. The command is executed just in case all of those rule checks are successful. As we will describe below, the set of rule checks associated with a generic command can vary from time to time as the system is running.

Each rule check has one or more rule actions which are executed when the rule check's condition fails. By default, there is a single rule action which simply reports the rule check's failure, thereby preventing execution of the command being checked. Alternatively, the rule action may attempt to ameliorate the failure by creating a suitable set of what we call "fixup" commands. "Fixup" commands are checked and executed just like any other commands. Assuming that the fixup commands executed successfully, the commands will be executed.

A Transaction: consists of a sequence of related commands which are to be treated as a single unit of work. Should any command in the sequence fail, the effects of any preceding commands within the transaction are rolled back, i.e., undone, by means of the undo commands. The result is the same as if the transaction had never started. Assuming that all commands execute successfully, a transaction is explicitly either committed, in which case the effects of the commands persist, or aborted, in which case the commands are undone.

The invention solves the problem by using a rule-based system to ensure the integrity of database content as it undergoes modification. We refer to a such a rule-based system as a "semantic-checker". We associate rule checks with commands that modify a database. The conditions of those rules are used to decide whether suitable preconditions exist for proposed modifications to the database. If not, the associated actions, if any, attempt to bring about such preconditions. The semantic checker prevents the proposed modifications if the preconditions remain unmet.

Important features of the solution are given as follows:

Rule Checks are encapsulated in the semantic checker module of the semantic database system, and only associated with their commands at run-time. This "loose coupling" between commands and rules make it easy to update semantic checking without touching the remainder of the system.

Likewise, rule actions are encapsulated in the semantic checker module and only associated with their rule checks at run-time. Thus it is easy to update fixup behavior without touching the remainder of the system.

Additionally, different applications can customize semantic checking by adding, removing, or replacing specific rule checks ( likewise rule actions) at run time.

Further, due to the loose coupling between commands and rule checks, and the loose coupling between rule checks and rule actions, it is possible to vary the time system's checking and fixup behavior according to circumstances at run-time. Our current implementation allows the semantic database system to operate in one of two disjoint modes: either "loose mode" ( not related to loose coupling) or "strict mode", depending on whether one desires lenient or rigorous enforcement of prerequisites for commands. In strict mode, the rule checks associated with a particular command may have more stringent conditions and there may be additional rule checks associated with a command. In the same vein, the set of rule actions associated with a rule check may vary according to mode. For example, suppose a command to delete a certain OCCM concept is attempted. In loose mode, rule actions may take the liberty of deleting other concepts as required to satisfy the preconditions of the delete concept command. In strict mode, the command may just be disallowed. Note that in general, there is no limit on the number of modes or the manner in which modes are related. For example, modes may be organized hierarchically, such that each mode builds upon its predecessors by incorporating all of the rule checks and actions, as well as adding additional rule checks and actions. Also note that modes need not be identified with levels of semantic checking at all. As a further example, modes could be based on user expertise. In a simple approach, there could be a sophisticated user mode and a novice user mode, among others. Going further, user expertise could be gauged on a command-by-command basis via adaptive models as in IBM's COACH system.

The process of attempting to execute a command is captured by four procedures below. If the "attempt command" procedure returns "success", we can continue to the next command (if any). Otherwise, the current transaction can not be completed successfully, and any previously executed commands within the current transaction are rolled back.

Attempt command (command):

-continued

```
        look up rule checks for command according to the current mode
        verify command(rule checks)
        if verification fails
            if there are fixup commands
                attempt fixup commands
            else
                roll back transaction
                stop
        execute command
        create and record reverse command
        return "success"
Verify command (rule checks):
    for each rule check
        if condition of rule check fails (i.e., precondition of
            command not met)
                look up rule actions for rule check according to the
                    current mode
                attempt rule actions(rule actions)
                if attempt fails
                    return "failure"
    return "success"
Attempt rule actions (rule actions):
    for each rule action
        if the action is to report a semantic error
            return "failure"
        else
            action creates fixup commands
    return "success"
Attempt fixup commands:
    for each fixup command
        attempt command(fixup command)
    return
```

The actual operation of the instant invention can be readily followed from the flow charts FIG. 1 to FIG. 4. The initial flowchart FIG. 1 depicts the "Attempt command" process for a given command at 100. It is initiated by looking up rule checks for the command according to the current mode at 101. This is followed by instructions that attempt to verify the command according to its rule checks at 102. Query 103 is whether verification fails. If the answer is yes (it does fail), then proceed to query 104, as to whether any fixup commands are available for this command. In case the answer is no, proceed to roll back the current transaction at 105, and stop at 106. If the answer at 104 is yes, carry out attempt fixup commands at 108 (note that fixup commands, if any, will be executed like any other command, and that might also lead ultimately to rolling back the transaction at 105 and stopping at 106). Assuming that fixup commands complete normally at 108, go on to execute this command at 107, create and record its reverse command at 109, and return success at 110. Should the query at 103 determine that verification does not fail (the answer is no), then similarly execute this command at 107, create and record its reverse command at 109, and return success at 110.

Figure 2:
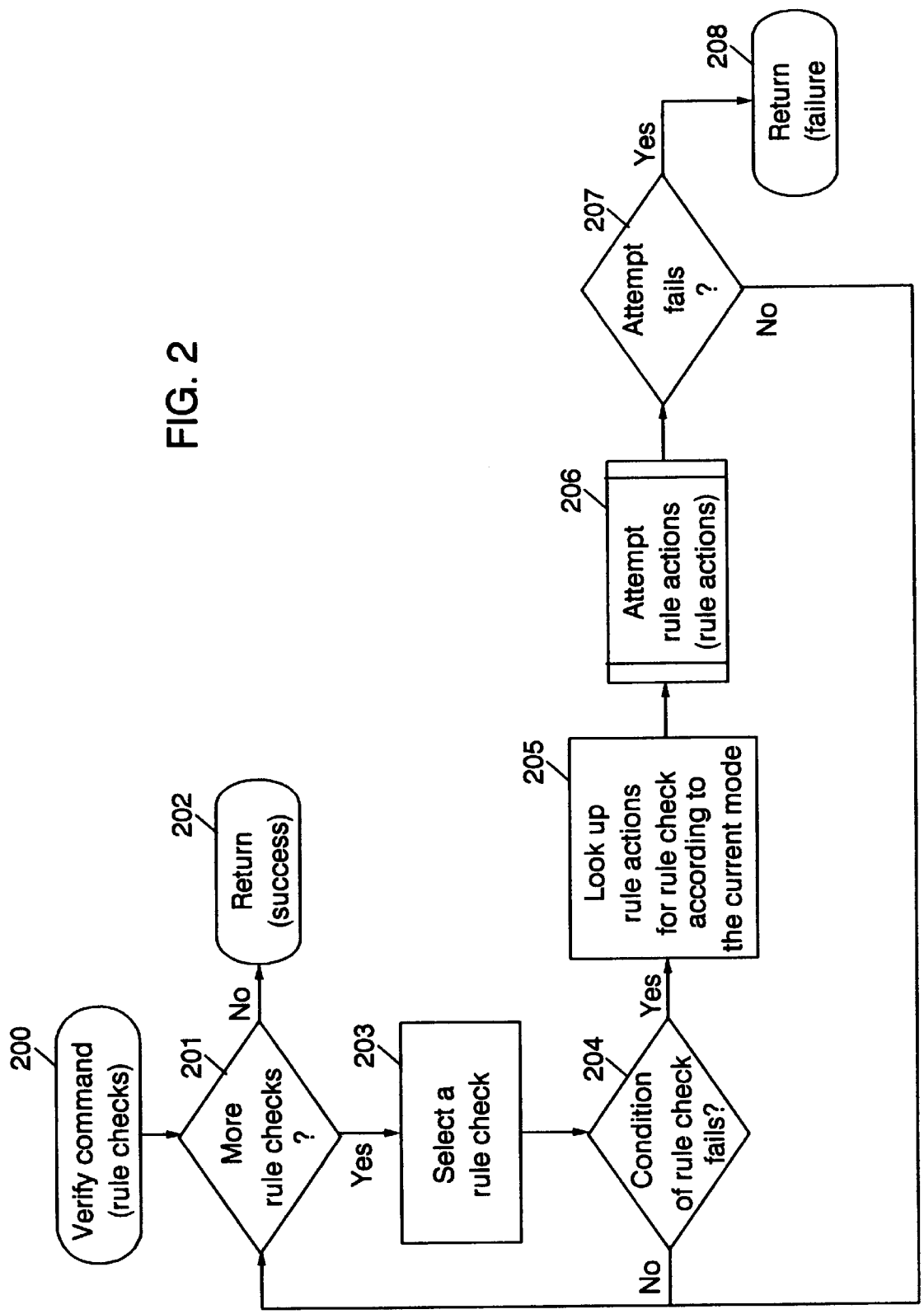
FIG. 2 Depicts the process of attempting to verify a command.

FIG. 2 depicts the process of attempting to verify a command according to its rule checks at 200, commencing with a query at 201 as to whether there are any more (as yet unchecked) rule checks. In case the answer is no, return success at 202. If the answer is yes, proceed at 203 to select an (as yet unchecked) rule check. Now, at 204 there is a query to determine if the selected rule checks condition fails. If the result is no, go back to 201. Otherwise, go on to 205 and look up the rule actions for the selected rule check according to the current mode. Following that, at 206 carry out the instructions to attempt those rule actions. Should it be determined at 207 that the attempt failed, return failure at 208. On the other hand, if the attempt succeeded, go back to 201.

Figure 3:
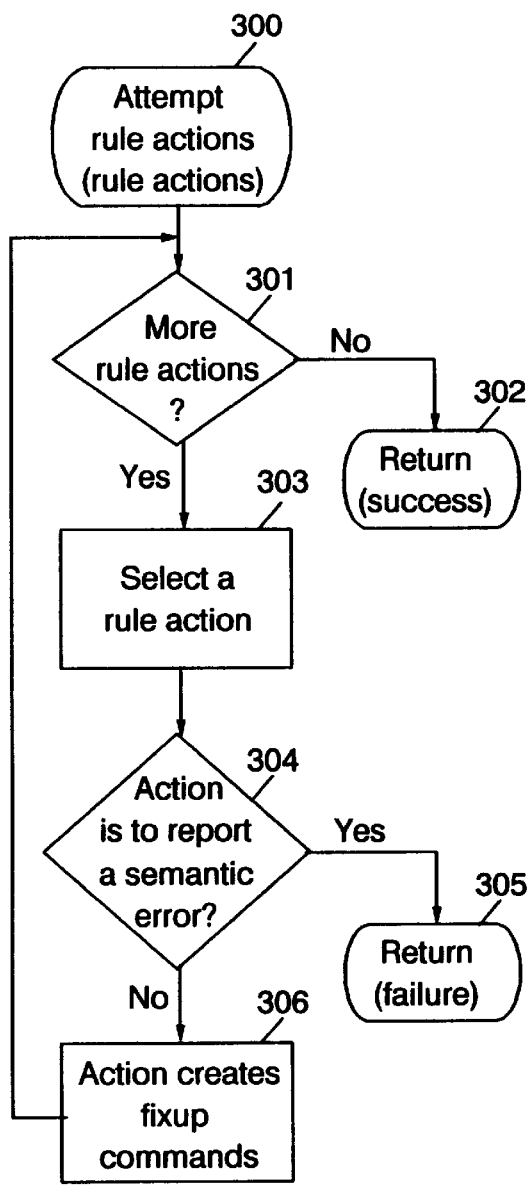
FIG. 3 Flow Chart shows the process of attempting a given set of rule actions.

FIG. 3, starting at 300, depicts the process of attempting a given set of rule actions. At 301, determine whether any rule actions remain to be attempted. If the answer is no, return success at 302. Alternatively, at 303 select a rule action to be attempted. In case the rule action is to report a semantic error (determined at 304), return failure at 305. Otherwise, the rule action creates one or more fixup commands at 306, then the procedure goes back to 301.

Figure 4:
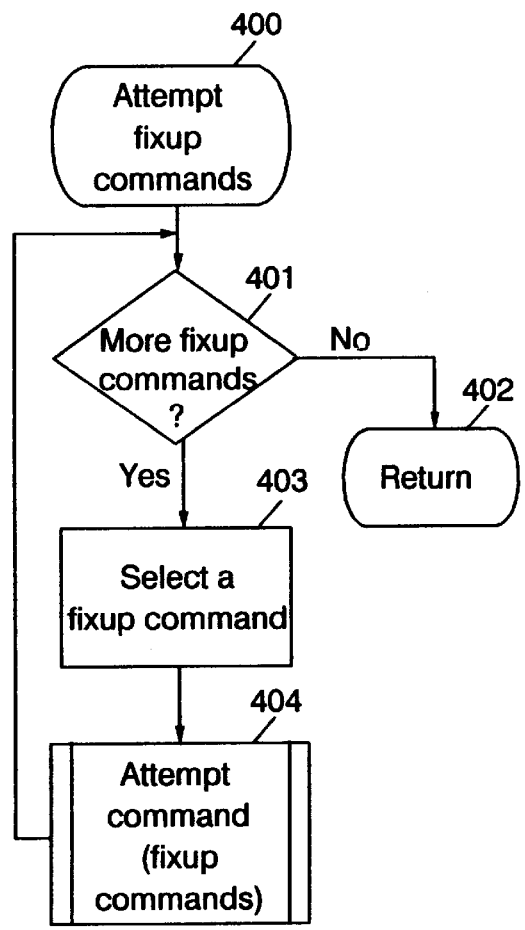
FIG. 4 Depicts the "Attempt fixup commands" process.

FIG. 4, beginning with 400, depicts the "Attempt fixup commands" process. A query for more (as yet unattempted) fixup commands is posed at 401. If none exist, return success at 402. Otherwise, an as yet unattempted fixup command is selected at 403, then instructions to attempt that command are followed at 404 (which recursively invokes the " attempt command" process at 100), followed by a transition back to 401.

We claim:

1. A computer programming system for checking and enabling database updates in a dynamic, multi-modal, run time configurable and rule based manner, comprising:

means of configuring and determining at run time, whether suitable preconditions exist for proposed modifications to said database, means for using rule checks that are tied to particular commands to check if the preconditions exist by examining the associated rule checks of commands involved in making the proposed modifications, means for bringing about said preconditions, if said preconditions are not available at said run time, and preventing said proposed modifications, if said preconditions remain unmet.

2. The programming system of claim 1, including means for changing said system's semantic checking behavior at run time by selecting among different modes for which said rule checks and their rule actions have been defined.

3. The programming system of claim 2, including means to customize said semantic checking for applications by adding, removing and or replacing said rule checks and or their rule actions.

4. The programming system of claim 1, wherein said computer system is modular to provide a separation between database update operations and the checking or enabling preconditions for those operations.

5. A computer programming method for checking and enabling database updates which is dynamic, multi-modal, configurable at run time, and rule based, comprising the steps of:

determining whether suitable preconditions exist for proposed modifications to said database using rule checks that are tied to particular commands, examining the rule checks tied to the commands to make the modifications to determine if the suitable preconditions exist, bringing about said preconditions, if said preconditions are not available at run time, preventing the said proposed modifications, if said preconditions remain unmet.

6. The computer programming method of claim 5, including the step of changing checking behavior at said run time by selecting among different modes for which rule checks and rule actions have been defined.

7. The computer programming method of claim 6, including the step of customizing said semantic checking by adding, removing, and or replacing rule checks and or their rule actions.

8. The computer programming system of claim 5, including the step of having a modularized computer programming system that provides a separation between database update operations and checking or enabling preconditions for those operations.

9. A computer program product, for use with a graphic display device, provided on a recording medium on which is recorded a programming method for checking and enabling database updates with a dynamic multi-modal, rule based system, said programming method comprising the steps of:

determining at run time, whether suitable preconditions exist for proposed modifications to said database using rule checks which are tied to particular commands, examining any rule checks tied to any command for making the modifications to determine if the suitable preconditions exist, bringing about said preconditions, if said preconditions are not available at said run time, preventing the said proposed modifications, if said preconditions remain unmet.

10. The method of the computer program product of claim 9, including the step of changing said semantic checking behavior at run time by selecting among different modes for which said rule checks and rule actions have been defined.

11. The method of the computer program product of claim 10, including the step of customizing said semantic checking by adding, removing, and or replacing rule checks and or their rule actions.

12. The method of the computer program product of claim 9, wherein modularity of said computer program product provides a separation between database update operations and checking or enabling preconditions for those operations.

13. A system for checking and enabling database updates in a dynamic, multi-modal, run time configurable and rule based manner, comprising:

means of determining at run time, whether suitable preconditions exist for a proposed modification to said database, means providing rule checks that are tied to particular commands, means examining said rule checks tied to at least one command used in making the modification to determine if the preconditions exist, means for bringing about said preconditions, if said preconditions are not available at said run time, means preventing the said proposed modification, if said preconditions remain unmet.

14. The system of claim 13, including means for changing checking behavior at run time by selecting among different modes for which said rule checks and their rule actions have been defined.

15. The system of claim 14, including means to customize said semantic checking by adding, removing, and or replacing said rule checks and their rule actions.

16. The system of claim 13, wherein said system is modularized to provide a separation between database update operations and checking or enabling preconditions for those operations.

17. A computer programming system for checking and enabling database updates in a dynamic, multi-modal, run time configurable and rule based manner, comprising:

a mechanism for configuring and determining at run time, whether suitable preconditions exist for proposed modifications to said database, a mechanism providing rule checks which are tied to particular commands, a mechanism for examining any rule check tied to any command for making the modifications to determine if the suitable preconditions exist, a mechanism for bringing about said preconditions, if said preconditions are not available at said run time, a mechanism for preventing said proposed modifications, if preconditions remain unmet.

\* \* \* \* \*